United States Patent [19]

Miller et al.

[11] 4,288,351

[45] Sep. 8, 1981

[54] WATER REDUCIBLE ALKYD RESIN COATING COMPOSITION

[75] Inventors: Lester I. Miller, Troy, Mich.; Thomas J. Smearing, Wilmington, Del.

[73] Assignee: E. I. Du Pont de Nemours and Company, Wilmington, Del.

[21] Appl. No.: 153,205

[22] Filed: May 27, 1980

Related U.S. Application Data

[63] Continuation-in-part of Ser. No. 20,984, Mar. 16, 1979, abandoned.

[51] Int. Cl.³ .................. C09D 3/52; C09D 3/66; C09D 5/02
[52] U.S. Cl. .................. 260/21; 260/22 CQ; 260/22 CB; 260/23 P; 260/29.2 E; 428/334; 428/339
[58] Field of Search .............. 260/21, 22 CB, 22 CQ, 260/23 P, 29.2 E; 428/334, 339

[56] References Cited

U.S. PATENT DOCUMENTS

| | | | |
|---|---|---|---|
| 3,269,967 | 8/1966 | Broadhead | 260/22 R |
| 3,376,241 | 4/1968 | Que | 260/20 |
| 3,463,750 | 8/1969 | Ghosh | 260/22 R |
| 3,474,060 | 10/1969 | Dhein et al. | 260/21 |
| 3,527,721 | 9/1970 | Hönel et al. | 260/21 |
| 3,660,330 | 5/1972 | Dhein et al. | 260/22 TN |
| 3,748,293 | 7/1973 | Torelli | 260/21 |
| 3,761,433 | 9/1973 | High | 260/22 A |
| 3,894,978 | 7/1975 | Montesissa et al. | 260/22 CB |
| 3,980,602 | 9/1976 | Jakubauskas | 260/29.6 TA |
| 4,056,495 | 11/1977 | Kawamura et al. | 260/22 CB |
| 4,081,411 | 3/1978 | Hunsucker | 260/22 CQ |
| 4,116,904 | 9/1978 | Verma | 260/22 R |
| 4,123,404 | 10/1978 | Lasher | 260/29.2 E |
| 4,132,686 | 1/1979 | Toyoshima et al. | 260/21 |
| 4,133,786 | 1/1979 | Harris et al. | 260/29.2 E |

FOREIGN PATENT DOCUMENTS

| | | |
|---|---|---|
| 748475 | 4/1970 | Belgium . |
| 803346 | 8/1973 | Belgium . |
| 45-35434 | 11/1970 | Japan . |
| 46-31342 | 9/1971 | Japan . |
| 47-13183 | 4/1972 | Japan . |
| 53-36853 | 10/1978 | Japan ................ 260/21 |
| 256140 | 4/1970 | U.S.S.R. . |

Primary Examiner—Ronald W. Griffin
Attorney, Agent, or Firm—Hilmar L. Fricke

[57] ABSTRACT

A water reducible coating composition that by the addition of a solution of water and an amine or ammonia forms a sprayable nonair polluting coating composition that can be dried at ambient temperatures and is useful for coating metal or plastic substrates and in particular for finishing or repairing automobiles and trucks; the coating composition contains a water soluble organic solvent, a binder and pigments.

The binder is of
(1) an alkyd resin that is preferably the esterification product of soya oil fatty acids, trimellitic anhydride isophthalic acid and trimethylol propane;
(2) an alkylated melamine formaldehyde resin,
(3) an acrylic dispersing resin and
(4) an organo metallic drier.

20 Claims, No Drawings

WATER REDUCIBLE ALKYD RESIN COATING COMPOSITION

CROSS REFERENCE TO RELATED APPLICATIONS

This application is a continuation-in-part of application Ser. No. 020,984 filed Mar. 16, 1979 now abandoned.

BACKGROUND OF THE INVENTION

This invention is directed to a coating composition and in particular to a coating composition that can be diluted with water to form a nonair polluting composition.

In view of stricter air pollution legislations and increased energy costs, it has become important for paint manufacturers to provide coating compositions that are nonair polluting and that dry under ambient temperature conditions. Along with the above, automotive and truck manufacturers and the automotive and truck repair industry require coating compositions that form finishes that are weatherable, durable, and have an excellent appearance. In particular, the repair industry requires finishes that have excellent adhesion to all types of painted or primed substrates. The novel coating composition of this invention meets the aforementioned requirements.

SUMMARY OF THE INVENTION

A coating composition containing about 40-90% by weight of a film forming binder, about 10-60% by weight of a water soluble organic solvent and pigments in a pigment to binder weight ratio of about 1:100-75:100 and up to 300:100, wherein the binder is of about
 (1) 60-90% by weight, based on the weight of the binder, of an alkyd resin which is the esterification product of soya oil fatty acids, trimellitic anhydride or trimellitic acid, isophthalic acid and trimethylol propane and has an acid number of about 20-100 and a weight average molecular weight of about 800-15,000 determined by gel permeation chromotography;
 (2) 0.5-15% by weight, based on the weight of the binder, of an alkylated melamine formaldehyde resin;
 (3) 1-20% by weight, based on the weight of the binder, of an acrylic dispersing resin;
 (4) 0.5-5% by weight, based on the weight of the binder, of an organo metallic drier.

The composition can be reduced to an aqueous based composition having an acceptable application viscosity with an aqueous composition containing sufficient base to provide a pH of about 6.5-9.0.

DETAILED DESCRIPTION OF THE INVENTION

The coating composition contains about 40-90% by weight of a film forming binder and usually about 70-85% by weight of the film forming binder. The remainder of the composition comprises a water soluble solvent. Minor amounts of water dispersible solvents can be added. For application, the composition is reduced to an application viscosity of about 16 to 50 seconds measured according to ASTM-1084-63 with an aqueous reducer solution. This reducer solution contains up to about 20% by weight of a water soluble solvent or solvents and sufficient ammonia or amine or a combination thereof to form a salt of the alkyd resin and the acrylic dispersing resin and provide a pH of about 6.5-9. Usually a pH of about 7-8 is used.

Typical water soluble solvents that can be used to form the composition and the aqueous reducer solution are as follows: ethylene glycol monoethyl ether, ethylene glycol monobutyl ether, propylene glycol propyl ether, isopropanol, ethanol, methanol, butanol and other alcohols, acetone, and the like. Small amounts of nonwater soluble solvents such as toluene, xylene, acetates and mineral spirits can be used. The amount of solvent added to the composition with the aqueous reducer solution can be adjusted to meet and comply with governmental regulations.

Ammonia or amine or a combination thereof used in the aqueous reducer solution reacts with free carboxyl groups of the alkyd resin and acrylic dispersing resin to form salt groups which allow the resins to be dispersed in an aqueous medium. The pH of the resulting composition can be adjusted to the aforementioned values. Typical amines that can be used are triethylamine, trimethylamine, ethanolamine, N,N-diethylethanolamine, N,N-dimethylethanolamine, N-methylethanolamine, monoisopropanolamine, butanolamine, diethylamine and the like.

The composition can be a clear but usually contains pigments in a pigment to binder weight ratio of about 1:100 to 75:100 and up to 300.100. Typical pigments that can be used are as follows: titanium dioxide, aluminum flake, red, yellow or orange iron oxide, "Irgazin" yellow and green, copper phthalocyanine green and blue, "Monastral" red, extender pigments and a wide variety of other organic and inorganic pigments.

The alkyd resin used in the composition is the esterification product of drying oil fatty acids, aromatic polycarboxylic acids and a polyhydric alcohol. To prepare the alkyd resin, the above constituents along with an esterification catalyst are charged into a reaction vessel. Either a conventional fusion or solution process using conventional equipment can be used to prepare the alkyd resin. Generally reaction temperatures of about 200°-275° C. for 1 to 5 hours are used to prepare the resin. The resulting alkyd resin has an acid number of about 20-100 and a weight average molecular weight of about 800-15,000 and a number average molecular weight of about 800-4000 determined by gel permeation chromatography.

Typical solvents that can be used in the solution process for making the alkyd resin are water miscible or water soluble and are as follows: ethers, aliphatic alcohols such as methanol, ethanol, propanol, isopropanol, butanol, ethylene glycol monoalkyl ethers, such as ethylene glycol monobutyl ether, propylene glycol monopropyl ether, ethylene glycol monoalkyl ether acetates, and the like.

Typical esterification catalysts that are used in the process for preparing alkyd resins are as follows: barium oxide, barium hydroxide, barium naphthenate, calcium oxide, calcium hydroxide, calcium naphthenate, lead oxide, lithium hydroxide, lithium naphthenate, lithium ricinoleate, sodium hydroxide, sodium naphthenate, zinc oxide, and lead tallate.

Typical drying oil fatty acids that are used to prepare alkyd resins are as follows: dehydrated castor oil fatty acids, heat-bodied soya oil fatty acids, tung oil fatty acids, linseed oil fatty acids, oiticica oil fatty acids, safflower oil fatty acids, soya oil fatty acids, and the like. Soya oil fatty acids are preferred.

Typical aromatic polycarboxylic acids that can be used to prepare the alkyd resin are as follows: isophthalic acid, terephthalic acid, phthalic acid, trimellitic acid or its anhydride. A mixture of isophthalic acid and trimellitic acid or its anhydride is preferred.

Typical polyhydric alcohols that can be used to prepare alkyd resins are as follows: ethylene glycol, propylene glycol, 1,3-butylene glycol, pentanediol, neopentyl glycol, hexylene glycol, diethylene glycol, dipropylene glycol, triethylene glycol, glycerol, trimethylolethane, trimethylolpropane, pentaerythritol, methylglucoside, dipentaerythritol, and sorbitol. Trimethylol propane is preferred.

Monobasic organic acids also can be used to prepare alkyd resins and are as follows: abietic acid, benzoic acid, p-tert-butylbenzoic acid, caproic acid, caprylic acid, crotonic acid, 2-ethylhexoic acid, lauric acid, pelargonic acid, rosin acids, and the like.

Monofunctional alcohols also can be used to prepare alkyd resins and are as follows: butanol, pentanol, hexanol, isooctanol, ethoxyethanol, and diethylene glycol monobutyl ether.

Drying oils also can be used to prepare the alkyd resin such as castor oil, heat bodied soya oil, soya oil, corn oil, dehydrated castor oil, linseed oil, oiticica oil, safflower oil and tung oil.

One particularly preferred alkyd resin that forms a high quality composition is the esterification product of soya oil fatty acids/isophthalic acid/trimellitic acid or its anhydride/trimethylol propane that has an acid number of about 20-100 and preferably 35-45 and a weight average molecular weight of about 2,000-12,000.

The alkylated melamine formaldehyde resin used in the composition can contain 1-4 carbon atoms in the alkyl group and is water soluble or water dispersible. One preferred resin that forms a high quality product is a partially methylated melamine formaldehyde resin that has an equivalent weight of about 225-325. By equivalent weight is meant, the grams of alkylated melamine formaldehyde resin required to react with one gram mole of carboxyl, hydroxyl or amide groups of a polymer.

The acrylic dispersing resin used in the composition contains sufficient carboxyl groups to disperse resin and pigments.

Useful types of resin are disclosed in Jakubauskas U.S. Pat. No. 3,980,602 issued Sept. 14, 1976. One preferred resin that forms a high quality product is a polymer of methyl methacrylate/styrene/butyl acrylate/acrylic acid. The following ratio of constituent is particularly preferred 25/30/35/10.

The composition contains organo metallic driers. Typical driers are cobalt naphthenate, managanese naphthenate, nickel naphthenate, nickel octoate, zirconium octoate, lead tallate and the like.

One preferred combination of driers comprises zirconium octoate, cobalt naphthenate and 1,10 phenanthroline.

One particularly useful coating composition of this invention comprises about 15-30% by weight of water soluble solvents and 70-85% by weight of a film forming binder. The binder is of about 80-85% by weight of the alkyd resin of soya oil fatty acids, isophthalic acid, trimellitic acid or its anhydride and trimethylol propane having an acid number of 35-45 and a weight average molecular weight, determined as above, of 2,000-12,000; 1-4% by weight of a partially methylated melamine formaldehyde resin having an equivalent weight of about 225-325, 13-17% by weight of an acrylic dispersing resin of styrene/methyl methacrylate/butyl acrylate/acrylic acid; and 1-3% by weight of an organo metallic drier of zirconium octoate, cobalt naphthenate and phenanthroline.

In another useful coating composition, the binder is of about (1) 50-90% by weight, based on the weight of the binder, of an alkyd resin which is the esterification product of soya oil fatty acids, isophthalic acid and trimethylol propane and has an acid number of about 20-100 and a weight average molecular weight of about 800-15,000 determined by gel permeation chromatography;

(2) 0.5-5% by weight, based on the weight of the binder, of an alkylated melamine formaldehyde resin;

(3) 9-20% by weight, based on the weight of the binder, of an acrylic dispersin resin;

(4) 0.5-5% by weight, based on the weight of the binder, of an organo metallic drier.

As aforementioned, the composition is pigmented for most uses. The pigments are formed into a mill base by grinding the pigment with the alkyd resin or acrylic dispersing resin and the resulting mill base is added to form a pigmented composition. The mill base is prepared by conventional grinding techniques such as sand grinding, ball milling, attritor grinding and the like. After reduction to an application viscosity with an aqueous solution containing ammonia or amine as discussed above, the composition can be applied to a variety of substrates by any of the conventional application methods such as spraying, electrostatic spraying, dipping, brushing, flow coating, roller coating and the like. The resulting coatings can be dried at ambient temperatures or baked at relatively low temperatures up to about 140° C. for about 5 minutes to 2 hours. The resulting coating is about 0.1-5 mils thick and is glossy, durable, weatherable, and has an excellent appearance.

The composition has excellent adhesion to all types of substrates such as wood, glass, bare metal, metal painted with the following: acrylic enamel, acrylic lacquer, acrylic dispersion enamel acrylic dispersion lacquer, alkyd enamel, conventional alkyd or epoxy primers; fiberglass reinforced with polyester painted as above; acrylonitrile/butadiene/styrene plastics or other plastics painted as above. The aforementioned characteristics make the composition particularly useful as a finish or a refinish used for automobiles and truck bodies.

The following example illustrates the invention. All quantities are on a weight basis unless otherwise indicated.

EXAMPLE 1

The following pigment dispersions are prepared:

| White Pigment Dispersion | Parts By Weight |
| --- | --- |
| Alkyd resin solution(80% by weight solids alkyd resin of soya oil fatty acids/isophthalic acid/trimellitic acid/trimethylol propane having an acid No. of about 40 and a weight average molecular | 16.57 |

| White Pigment Dispersion | Parts By Weight |
|---|---|
| weight of about 1,000 determined by gel permeation chromatography) | |
| Ethylene glycol monoethyl ether | 17.77 |
| Titanium dioxide pigment | 65.66 |
| Total | 100.00 |

The above constituents are blended together and charged into a conventional sand mill and ground to a 0.5 mil fineness.

| Black Pigment Dispersion | Parts By Weight |
|---|---|
| Portion 1 | |
| Alkyd resin solution (described above) | 45.46 |
| Ethylene glycol monoethyl ether | 18.91 |
| Carbon Black Pigment | 5.45 |
| Portion 2 | |
| Alkyd resin solution (described above) | 22.73 |
| Ethylene glycol monoethyl ether | 7.45 |
| Total | 100.00 |

Portion 1 is charged into an attritor and ground to a 0.25 mil fineness. Portion 2 is charged with the portion 1 into the attritor and ground to a 0.25 mil fineness.

| Blue Pigment Dispersion | Parts By Weight |
|---|---|
| Acrylic Resin Solution (76% solids in isopropanol of an acrylic polymer of 25% methyl methacrylate, 30% styrene, 35% butyl acrylate and 10% acrylic acid) | 26.19 |
| Ethylene glycol monoethyl ether | 29.32 |
| Ethylene glycol monobutyl ether | 11.41 |
| Blue Pigment (phthalocyanine blue pigment) | 23.08 |
| Total | 100.00 |

The above constituents are charged into an attritor and ground to a 0.25 mil fineness.

The following tintings are prepared:

| White Tinting | Parts By Weight |
|---|---|
| White pigment dispersion (prepared above) | 41.82 |
| Alkyd resin solution (described above) | 41.62 |
| Methylated Melamine Formaldehyde Resin Solution (80% weight solids of a partially methylated melamine formaldehyde resin having an equivalent weight of 225-325 in a 1:1 isopropanol/isobutanol solvent) | |
| Acrylic resin solution (described above) | 9.23 |
| Toluene | 0.58 |
| Ethylene glycol monobutyl ether | 4.73 |
| Methyl ethyl ketoxime | 0.24 |
| Total | 100.00 |

The above constituents are thoroughly mixed together to form a tinting that has a pigment to binder weight ratio of about 57.97/100 and a volume solid content of 63.8%.

| Black Tinting | Parts By Weight |
|---|---|
| Black pigment dispersion (prepared above) | 39.07 |
| Alkyd resin solution (described above) | 41.97 |
| Methylated Melamine Formaldehyde Resin Solution(described above) | 2.35 |
| Methyl ethyl ketoxime | 0.31 |
| Ethylene glycol monobutyl ether | 3.30 |
| Acrylic resin solution (described above) | 13.00 |
| Total | 100.00 |

The above constituents are thoroughly mixed together to form a tinting base that has a pigment to binder weight ratio of 3.2/100 and a volume solids content of about 63.84%.

| Blue Tinting | Parts By Weight |
|---|---|
| Blue Pigment Dispersion (prepared above) | 23.68 |
| Alkyd resin solution (described above) | 64.51 |
| Methylated Melamine Formaldehyde Resin Solution(described above) | 2.46 |
| Methyl ethyl ketoxime | 0.33 |
| Acrylic resin solution (described above) | 6.58 |
| Ethylene glycol monobutyl ether | 2.44 |
| Total | 100.00 |

The above constituents are thoroughly mixed together to form a tinting base that has a pigment to binder weight ratio of about 5/100 and a volume solids of about 63.71%

A drier composition is prepared by blending together the following:

| | Parts By Weight |
|---|---|
| Zirconium Octoate solution containing 6% by weight zirconium in mineral spirits | 37.79 |
| "Cobalt Hydrocure" solution (55% solids cobalt naththenate in mineral spirits) | 56.60 |
| 1,10 phenanthroline | 5.61 |
| Total | 100.00 |

A thinner composition is prepared by blending together the following:

| | Parts By Weight |
|---|---|
| Ammonia solution(29% aqueous solution) | 2.15 |
| Deionized water | 97.85 |
| Total | 100.00 |

A paint is formulated by blending together the following:

| | Parts By Weight |
|---|---|
| White tinting (prepared above) | 99.68 |
| Black tinting (prepared above) | 0.27 |

|  | Parts By Weight |
|---|---|
| Blue tinting (prepared above) | 0.05 |
| Drier composition (prepared above) | 2.50 |
| Total | 102.50 |

A sprayable coating composition is prepared by blending 1 part by volume of the above paint with 1.5 parts by volume of the thinner. The resulting paint is sprayed onto the following panels: unprimed cold rolled steel, unprimed phosphatized steel, alkyd resin primed phosphatized steel, thermosetting acrylic enamel/alkyd resin primed steel, acrylic lacquer/alkyd resin primed steel. The panels are dried at an ambient temperature for about two hours and a dust free film is formed that is about 1–3 mils thick. After twenty-four hours the films have a hardness of about 1.1 knoops, a gloss measured at 20° of 86 and at 60° of 95 and water spot resistance of about 7 based on a scale of 0–10 where 10 represents no water spotting. After 1 week at ambient temperatures, the films have excellent resistance to gasoline, good chip resistance and cold crack resistance and improved resistance to water spotting.

EXAMPLE 2

A silver mill base is prepared as follows:

|  | Parts By Weight |
|---|---|
| Alkyd resin solution (described in Example 1) | 67.57 |
| Aluminum Paste (16.19 parts of aluminum flake in 24.91 parts mineral spirits) | 24.91 |
| Ethylene glycol monoethyl ether | 7.52 |
| Total | 100.00 |

The above constituents are thoroughly blended together to form a mill base.

A thinner solution is prepared by blending together the following constituents:

|  | Parts By Weight |
|---|---|
| Acetone | 17.11 |
| Diethylene glycol monobutyl ether | 3.38 |
| Deionized Water | 77.34 |
| Ammonia solution (29% aqueous solution) | 2.17 |
| Total | 100.00 |

A silver paint is prepared by blending together the following constituents:

|  | Parts By Weight |
|---|---|
| Silver Mill Base (prepared above) | 22.00 |
| Acrylic resin solution (described in Example 1) | 12.42 |
| Methyl ethyl ketoxime | 0.32 |
| Ethylene glycol monoethyl ether | 1.86 |
| Alkyd resin solution (described in Example 1) | 50.47 |
| Methylated Melamine Formaldehyde Resin Solution (described in Example 1) | 2.39 |
| Ethylene glycol monobutyl ether | 6.07 |

|  | Parts By Weight |
|---|---|
| Toluene | 1.09 |
| Drier Composition (prepared in Example 1) | 3.38 |
| Total | 100.0 |

A sprayable composition is prepared by blending about 1 part by volume of the above paint with about 1.5 parts by volume of the above thinner solution. The resulting paint is sprayed onto phosphate treated steel panels coated with an alkyd resin primer and dried at ambient temperatures for two hours to form a 1–3 mil thick film.

After about two weeks at ambient temperatures the resulting films have a hardness of about 1.9 knoops, a gloss measured at 20° of 79 and a gloss measured at 60° of about 98. The films have excellent adhesion to the substrates and have an excellent appearance and good weatherability.

EXAMPLE 3

A red mill base is prepared as follows:

|  | Parts By Weight |
|---|---|
| Alkyd resin solution (described in Example 1) | 23.45 |
| Red Iron Oxide Pigment | 56.29 |
| Ethylene glycol monoethyl ether | 20.26 |
| Total | 100.00 |

The above constituents are charged into a sandmill and are ground in a sandmill to a 0.25 mil fineness to form a mill base.

A thinner solution is prepared by blending together the following constituents:

|  | Parts By Weight |
|---|---|
| Methanol | 3.44 |
| Diethylene glycol monobutyl ether | 1.72 |
| Isopropanol | 13.96 |
| Ammonia solution (29% aqueous solution) | 2.21 |
| Deionized Water | 78.67 |
| Total | 100.00 |

A red paint is prepared by blending together the following constituents:

|  | Parts By Weight |
|---|---|
| Red Mill Base (prepared above) | 16.38 |
| Acrylic resin solution (described in Example 1) | 11.61 |
| Methyl ethyl ketoxime | 0.30 |
| Ethylene glycol monoethyl ether | 1.68 |
| Alkyd resin solution (described in Example 1) | 57.21 |
| Methylated Melamine Formaldehyde Resin Solution (described in Example 1) | 2.24 |
| Toluene | 1.67 |
| Ethylene glycol monobutyl ether | 5.75 |
| Drier Composition (prepared in Example 1) | 5.16 |

-continued

|  | Parts By Weight |
|---|---|
| Total | 100.00 |

A sprayable composition is prepared by blending about 1 part by volume of the above paint with about 1.5 parts by volume of the above thinner solution. The resulting paint is sprayed onto phosphate treated steel panels primed with an alkyd resin primer and baked for 30 minutes at 150° C. The resulting film is about 1-3 mils thick. The panels are exposed to ambient temperatures for about 1 week. The resulting films have a hardness of about 1.7 knoops and a gloss measured at 20° of about 85. The films have an excellent appearance and exhibit good weatherability.

We claim:

1. A coating composition comprising about 40-90% by weight of a film forming binder and about 10-60% by weight of a water soluble organic solvent and pigments in a pigment to binder weight ratio of about 1:100 to 300:100; wherein the binder consists essentially of about (1) 60-90% by weight, based on the weight of the binder, of an alkyd resin consisting essentially of the esterification product of soya oil fatty acid, isophthalic acid, trimellitic acid or its anhydride and trimethylol propane having an acid number of about 20-100 and a weight average molecular weight of about 800-15,000 determined by gel permeation chromatography;
   (2) 0.5-15% by weight, based on the weight of the binder, of an alkylated melamine formaldehyde resin;
   (3) 1-20% by weight, based on the weight of the binder, of an acrylic dispersing resin comprising styrene, an alkyl methacrylate, an alkyl acrylate and an ethylenically unsaturated carboxylic acid; and
   (4) 0.5-5% by weight, based on the weight of the binder, of an organo metallic drier.

2. The coating composition of claim 1 containing a sufficient amount of an aqueous reducer to provide an application viscosity of 16 to 50 seconds measured according to ASTM 1084-63; wherein the reducer comprises up to about 20% by weight of a water soluble solvent, water and sufficient base or amine or ammonia to provide the resulting composition with a pH of about 6.5-9.0.

3. The coating composition of claim 2 in which the base is ammonia.

4. The coating composition of claim 1 in which the alkyd resin has an acid number of about 35-45 and a weight average molecular weight of about 2,000-12,000.

5. The coating composition of claim 1 in which the alkylated melamine formaldehyde resin is a partially methylated melamine formaldehyde resin.

6. The coating composition of claim 1 in which the acrylic dispersing resin consists of styrene/methyl methacrylate/butyl acrylate/acrylic acid.

7. The coating composition of claim 1 in which the organo metallic drier consists essentially of zirconium octoate, cobalt naphthenate and phenanthroline.

8. The coating composition of claim 1 in which comprises about 15-30% by weight of water soluble solvents and 70-85% by weight of a film forming binder.

9. The coating composition of claim 1 which comprises about 15-30% by weight of water soluble solvents and 70-85% by weight of a film forming binder; wherein the binder consists essentially of
   (1) 80-85% by weight, based on the weight of the binder, of an alkyd resin having an acid number of about 35-45 and a weight average molecular weight of about 2,000-12,000,
   (2) 1-4% by weight, based on the weight of the binder, of a partially methylated melamine formaldehyde resin having an equivalent weight of about 225-325,
   (3) 13-17% by weight, based on the weight of the binder, of an acrylic dispersing resin consisting of styrene/methyl methacrylate/butyl acrylate/acrylic acid, and
   (4) 1-3% by weight, based on the weight of the binder, of an organo metallic drier consisting essentially of zirconium octoate, cobalt naphthenate and phenanthroline.

10. A metal substrate coated with about 0.1-5 mil thick layer of the dried coalesced composition of claim 1.

11. A coating composition comprising about 40-90% by weight of a film forming binder and about 10-60% by weight of a water soluble organic solvent and pigments in a pigment to binder weight ratio of about 1:100 to 75:100; wherein the binder consists essentially of about
    (1) 50-90% by weight, based on the weight of the binder, of an alkyd resin consisting essentially of the esterification product of soya oil fatty acids, isophthalic acid and trimethylol propane having an acid number of about 20-100 and a weight average molecular weight of about 800-15,000 determined by gel permeation chromatography;
    (2) 0.5-5% by weight, based on the weight of the binder, of an alkylated melamine formaldehyde resin;
    (3) 9-20% by weight, based on the weight of the binder, of an acrylic dispersing resin consisting essentially of styrene, an alkyl methacrylate, an alkyl acrylate and an ethylenically unsaturated carboxylic acid; and
    (4) 0.5-5% by weight, based on the weight of the binder, of an organo metallic drier.

12. The coating composition of claim 11 containing a sufficient amount of an aqueous reducer to provide an application viscosity of 16 to 50 seconds measured according to ASTM 1084-63; wherein the reducer comprises up to about 20% by weight of a water soluble solvent, water and sufficient base or amine or ammonia to provide the resulting composition with a pH of about 6.5-9.0.

13. The coating composition of claim 12 in which the base is ammonia.

14. The coating composition of claim 11 in which the alkyd resin has an acid number of about 35-45 and a weight average molecular weight of about 2,000-12,000.

15. The coating composition of claim 11 in which the alkylated melamine formaldehyde resin is a partially methylated melamine formaldehyde resin.

16. The coating composition of claim 11 in which the acrylic dispersion resin consists of styrene/methyl methacrylate/butyl acrylate/acrylic acid.

17. The coating composition of claim 11 in which the organo metallic drier consists essentially of zirconium octoate, cobalt naphthenate and phenanthroline.

18. The coating composition of claim 11 in which comprises about 15–30% by weight of water soluble solvents and 70–85% by weight of a film forming binder.

19. The coating composition of claim 11 which comprises about 15–30% by weight of water soluble solvents and 70–85% by weight of a film forming binder; wherein the binder consists essentially of
  (1) 80–85% by weight, based on the weight of the binder, of an alkyd resin having an acid number of about 35–45 and a weight average molecular weight of about 2,000–12,000,
  (2) 1–4% by weight, based on the weight of the binder, of a partially methylated melamine formaldehyde resin having a equivalent weight of about 225–325,
  (3) 13–17% by weight, based on the weight of the binder, of an acrylic dispersing resin consisting of styrene/methyl methacrylate/butyl acrylate/acrylic acid, and
  (4) 1–3% by weight, based on the weight of the binder, of an organo metallic drier consisting essentially of zirconium octoate, cobalt napthenate and phenanthroline.

20. A metal substrate coated with about 0.1–5 mil thick layer of the dried coalesced composition of claim 11.

* * * * *